(12) United States Patent
Ackerman

(10) Patent No.: US 11,249,298 B1
(45) Date of Patent: Feb. 15, 2022

(54) TALON AND PERCH BINOCULAR MOUNTING SYSTEM

(71) Applicant: Jim Ackerman, South Jordan, UT (US)

(72) Inventor: Jim Ackerman, South Jordan, UT (US)

( * ) Notice: Subject to any disclaimer, the term of this patent is extended or adjusted under 35 U.S.C. 154(b) by 0 days.

(21) Appl. No.: 17/486,465

(22) Filed: Sep. 27, 2021

Related U.S. Application Data

(60) Provisional application No. 63/085,259, filed on Sep. 30, 2020.

(51) Int. Cl.
*F16M 11/04* (2006.01)
*G02B 23/18* (2006.01)

(52) U.S. Cl.
CPC ........... *G02B 23/18* (2013.01); *F16M 11/041* (2013.01)

(58) Field of Classification Search
CPC .............................. F16M 11/041; G02B 23/18
USPC .................... 248/187.1, 309.1; 359/811, 819
See application file for complete search history.

(56) References Cited

U.S. PATENT DOCUMENTS

2007/0186459 A1*  8/2007  Horton .................. F41G 11/007
                                                             42/127

* cited by examiner

*Primary Examiner* — William Choi
(74) *Attorney, Agent, or Firm* — Lyman Moulton, Esq.; Moulton Patents, PLLC

(57) ABSTRACT

A rapid connect and disconnect binocular mounting system containing a talon and perch is disclosed in connection with a self-contained Binocular Sighting System, including monopod, pack and harness. A pedestal integrated with the perch provides a transition there between. An inner bolt and elongate talon are temporarily mounted to the binoculars and stay there with as an accessory to enable the rapid connection and rapid disconnection via a spring loaded front end and stabilizing notches in the tabular perch. The disclosed Binocular Sighting System is lightweight, self-contained and easy to set-up and take down. The user never has to access another piece of equipment, nor assemble or disassemble any parts in use. The user can access or store binoculars while on the move. The user can also shift to other fields of view instantly, without having to turn, re-level or adjust the set-up, as would be required with a tripod.

20 Claims, 8 Drawing Sheets

TALON AND PERCH BINOCULAR MOUNTING SYSTEM

CROSS REFERENCE

Priority is claimed to the Provisional patent application 63/085,259 titled Talon and Perch, filed Sep. 29, 2020 by Jim Ackerman and is included by cross reference in its entirety.

BACKGROUND

Hunters, birders and other binocular users often find they cannot hold binoculars still for extended periods of time, due to fatigue to the arms and shoulders from holding the binoculars up to the eyes. Mounting binoculars on tripods requires special adapters which are difficult and time consuming to use.

While almost all quality binoculars include a screw-in tripod mounting adaptive receptacle, all other attempts to solve the problem utilize more complex and awkward mechanisms that are cumbersome and difficult to use, often requiring special tools There have been no products available as original equipment or as an aftermarket to address this problem. An apparatus to simplify the process of using binoculars for extended periods of time quickly and with ease is needed in the market. In other words, there exists a need for a device and a system such as the Binocular Mounting System, that is not being met by any known or disclosed device or system of present.

SUMMARY OF THE INVENTION

The Binocular Mounting System is a quick connect mounting and dismounting device for connecting binoculars to tripods or other viewing tools. This ingenious and practical design utilizes a simple slotted cylinder that easily screws into the binocular's mounting receptacle, and a tripod adapter that quickly and easily slips through the slot in the cylinder that securely holds the binoculars on the tripod. Both mounting and dismounting are virtually instant, at the push of the spring-loaded cylinder head. The user never has to unscrew the mounting cylinder to use the binoculars free from the tripod.

The disclosure includes a quick connect and release device comprising an inner bolt comprising a back end and configured to define an elongate channel longitudinally there through from a top to a bottom thereof and to comprise a side pin and another side pin proximal a front threaded end. The disclosed device also includes an elongate talon configured to slidably receive the inner bolt and to define a top slot and a bottom slot to match the elongate channel top and bottom, a back end notch and a front end and a side track and another side track to receive the side pins. The disclosed device additionally includes a tabular perch comprising a bottom ledge, a top edge, a back edge and a front edge configured to be received through the elongate channel from the bottom slot to the top slot and comprise a bottom notch and a top notch on the front edge thereof. A wall width of the elongate talon engages with the tabular perch bottom notch and top notch and locks the tabular perch thereto against a spring force between the back ends limited by a travel of the side pins in the respective side tracks thereof.

Figure 1:
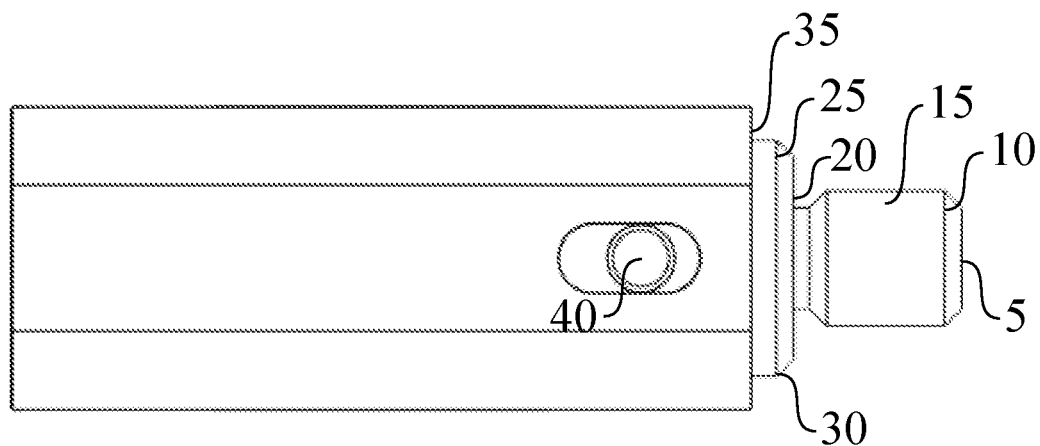
FIG. 1 is a side elevational view of the elongate talon of the talon and perch system in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

The binocular quick Connect Mounting Cylinder, also known as an inner bolt in this disclosure, is easily inserted into the binocular's screw-in tripod adapter receptacle. The Tripod Adapter is easily mounted to any standard tripod head using standard mounting procedures. Once the Tripod Adapter is secure atop the tripod, binoculars are ready to be mounted to the Tripod Adapter Mounting Shaft. Depressing the Quick Connect Mounting Cylinder expands the slot to accommodate the Tripod Adapter Mounting Shaft. When the depressed Quick Connect Mounting Cylinder is released, the interior sidewalls of the cylinder fit into the slots or notches of the Tripod Adapter Mounting Shaft also known as the elongate talon, securing a safe, snug fit for the binoculars.

To dismount the binoculars from the Tripod Adapter Mounting Shaft, the process is simply reversed, depressing the Quick Connect Mounting Cylinder and lifting the binoculars off of the top of the Tripod Adapter Mounting Shaft. There is no need to remove the Quick Connect Mounting Cylinder from the binoculars, either to use the binoculars free from the tripod, or to store them in a case or harness.

FIG. 1 is a side elevational view of the elongate talon of the talon and perch system in accordance with an embodiment of the present disclosure. The view includes the tip 5, the front chamfer 10, the threaded front end 15, the annular boss 20, the back chamfer 25, the o ring 30, the elongate talon 35 and the side pin 40 which slides in the side track shown. The side track is defined through the side wall of the elongate talon 35.

Figure 2:
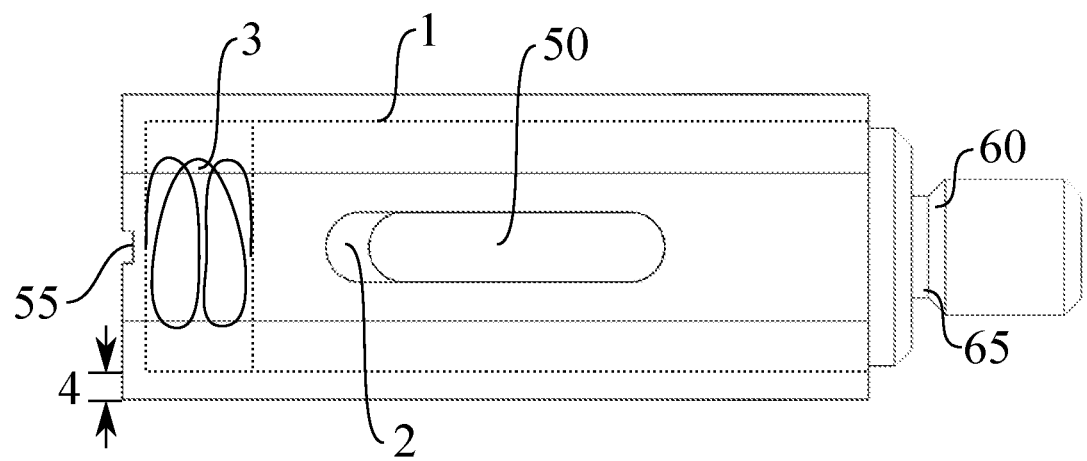
FIG. 2 is a top elevational view of the elongate talon of the talon and perch system in accordance with an embodiment of the present disclosure.

FIG. 2 is a top elevational view of the elongate talon of the talon and perch system in accordance with an embodiment of the present disclosure. The view includes some of the limitations of FIG. 1 and additionally includes a broken line profile of the inner bolt 1, the inner bolt to elongate talon overlap 2, the spring 3 and the wall and thickness 4. Additionally, the view includes the elongate channel 50, the back notch 55 and the chamfer 60 and inner bolt neck 65.

Figure 3:
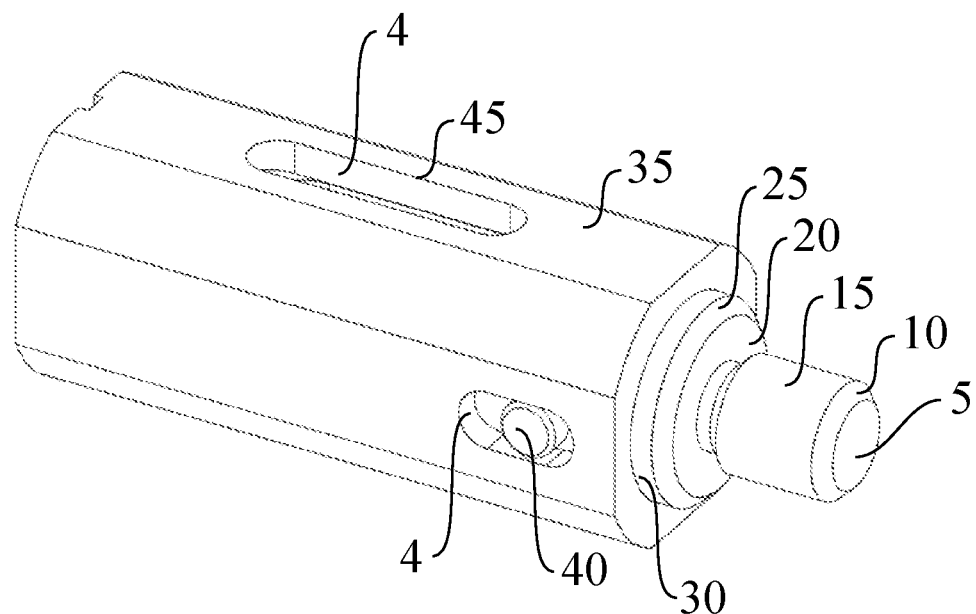
FIG. 3 is a side perspective view of the elongate talon of the talon and perch system in accordance with an embodiment of the present disclosure.

FIG. 3 is a side perspective view of the elongate talon of the talon and perch system in accordance with an embodiment of the present disclosure. The view includes some of the limitations of other drawings herein with the addition of the flat outside edges of the elongate talon 35 for engagement with a wrench or other torque tool. The wall thickness 4 is shown in perspective and uniform throughout the elongate talon 35 for engagement with notches in the tabular perch to be shown and described in detail. The wall thickness is shown through the cutout of the elongate channel 50 and the side track wherein the side pin slides back and forth.

Figure 4:
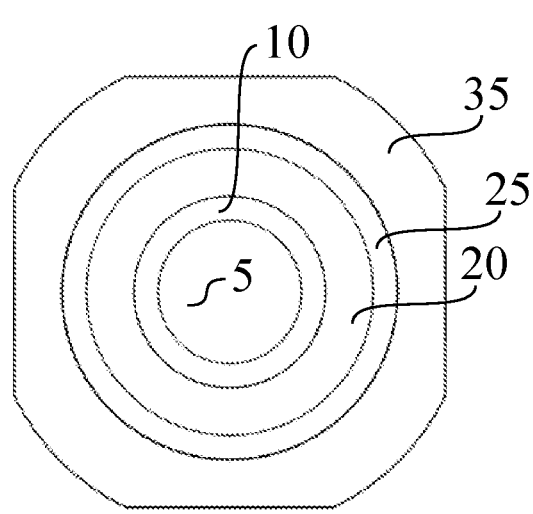
FIG. 4 is a front elevational view of the elongate talon of the talon and perch system in accordance with an embodiment of the present disclosure.

FIG. 4 is a front elevational view of the elongate talon of the talon and perch system in accordance with an embodiment of the present disclosure. The view includes limitations of other figures herein but also includes relative placements and relations with talon limitations.

Figure 5:
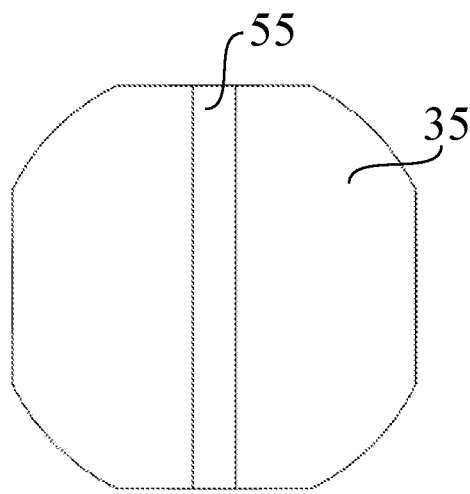
FIG. 5 is a back elevational view of the elongate talon of the talon and perch system in accordance with an embodiment of the present disclosure.

FIG. 5 is a back elevational view of the elongate talon of the talon and perch system in accordance with an embodiment of the present disclosure. The flat edges are shown in relation to an outside curvature of the elongate talon 35. The flat edges enable turning the elongate talon by hand or by a torque tool such as a wrench. The flat edges are also an ornamental aspect of the disclosure and don't indicate an inside geometry for either the inner bolt or the elongate talon.

Figure 6:
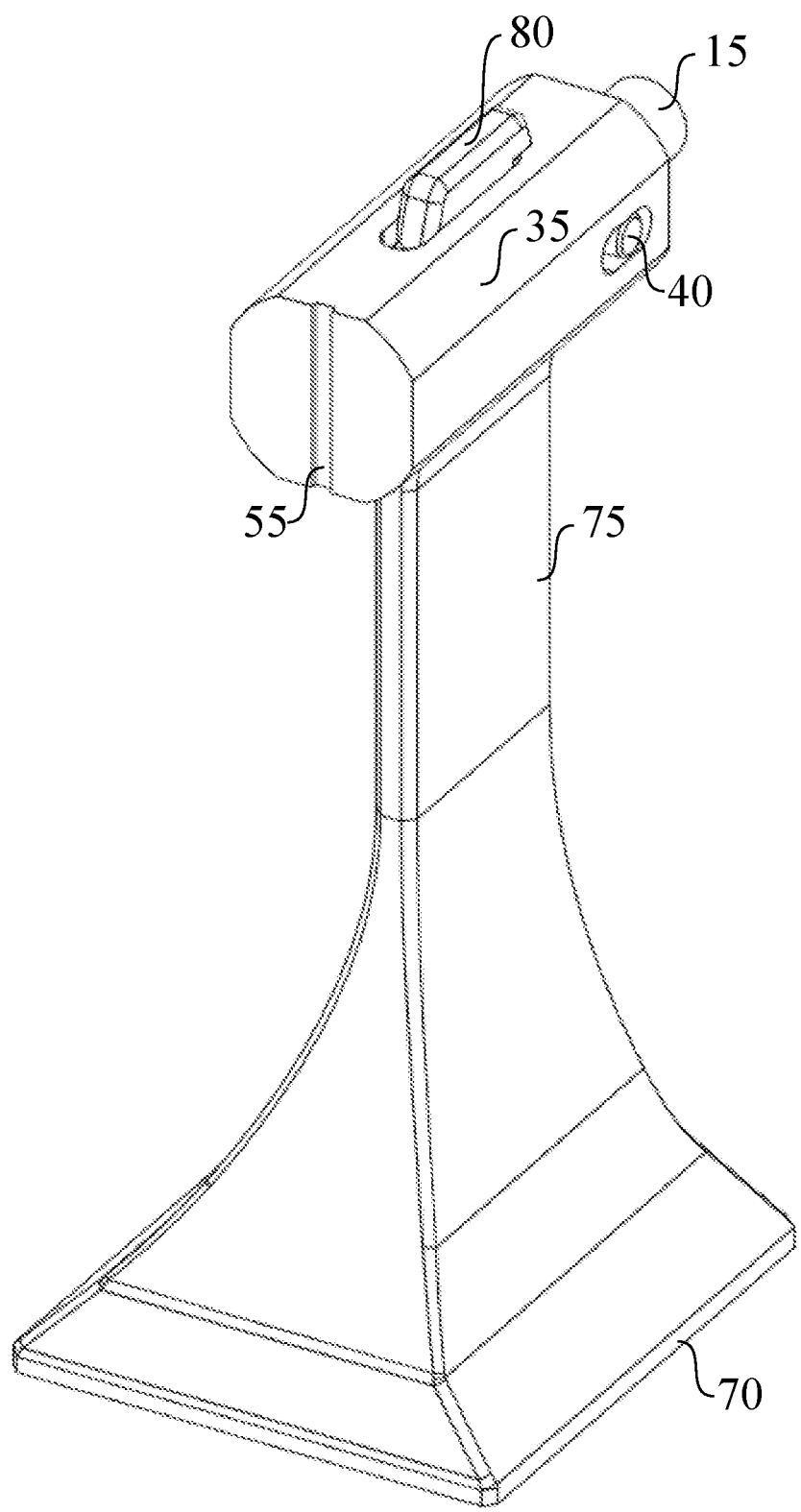
FIG. 6 is a back perspective view of the talon and perch system in accordance with an embodiment of the present disclosure.

FIG. 6 is a back perspective view of the talon and perch system in accordance with an embodiment of the present disclosure. In addition to limitations shared with other views and respective reference numbers, the webbing 75 and the top edge 80 are depicted as is the bottom shoe 70 of the pedestal.

Figure 7:
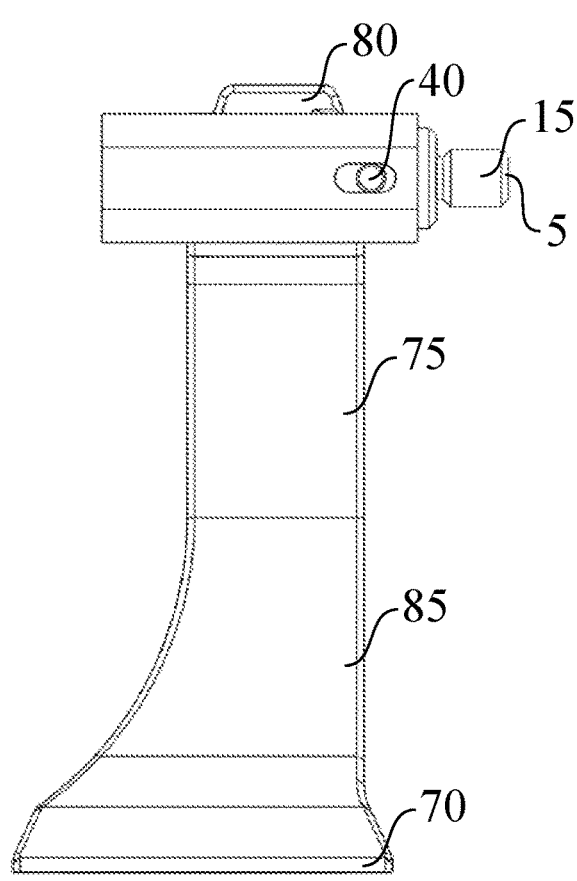
FIG. 7 is a side elevational view of the talon and perch system in accordance with an embodiment of the present disclosure.

FIG. 7 is a side elevational view of the talon and perch system in accordance with an embodiment of the present disclosure. Additionally, the pedestal flange 85 is referenced. The webbing 75 provides structural integrity parallel with binocular barrel chambers and provides lateral support from the tabular construction.

Figure 8:
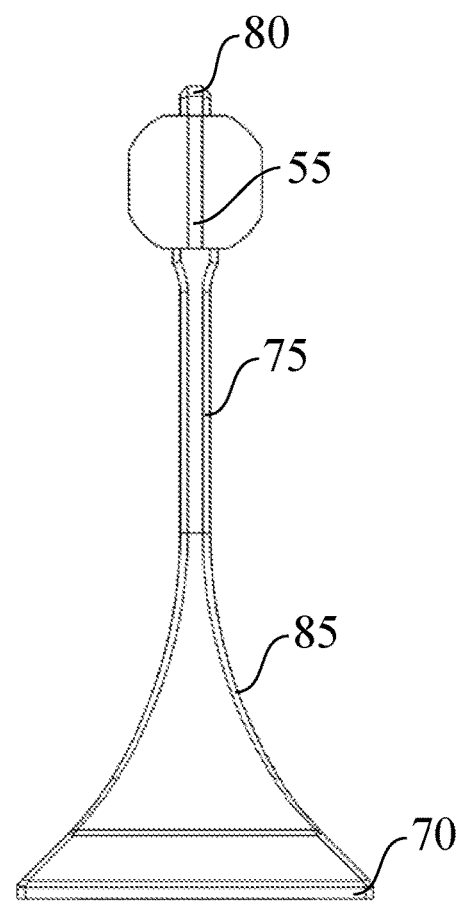
FIG. 8 is a back elevational view of the talon and perch system in accordance with an embodiment of the present disclosure.

FIG. 8 is a back elevational view of the talon and perch system in accordance with an embodiment of the present disclosure. The view depicts structural limitations common with other depicted views and respective reference numbers. It is noticed that the pedestal flanges out into a ledge between the tabular section 75 and the perch section for receiving the elongate talon but limiting its travel downward upon.

Figure 9:
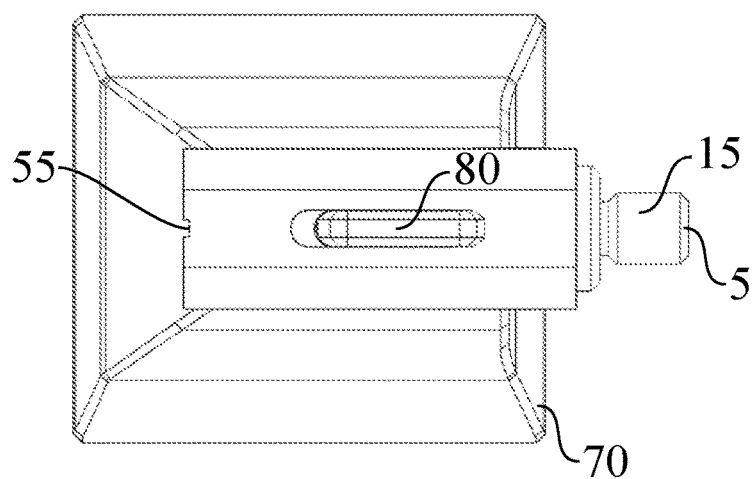
FIG. 9 is a top elevational view of the talon and perch system in accordance with an embodiment of the present disclosure.

FIG. 9 is a top elevational view of the talon and perch system in accordance with an embodiment of the present disclosure. The present view depicts structural limitations common with other depicted views and respective reference numbers. Additionally, it is shown the forward relation of the threaded end in relation to the pedestal shoe mount 70. The tabular perch 80 is also thrust forward by the spring force and overlap of the talon and perch as shown.

Figure 10:
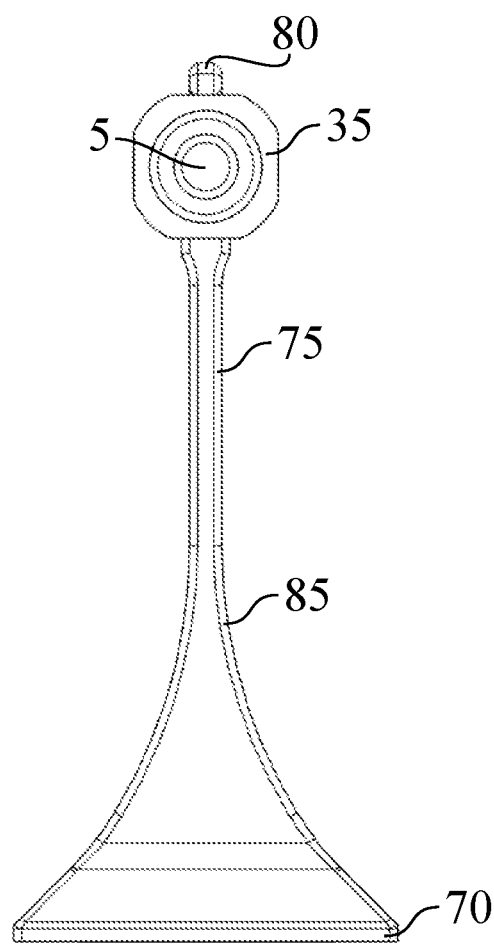
FIG. 10 is a front elevational view of the talon and perch system in accordance with an embodiment of the present disclosure.

FIG. 10 is a front elevational view of the talon and perch system in accordance with an embodiment of the present disclosure. The pedestal flange 85 provides a transition from the tabular perch to the larger footprint of the mounting shoe 70 for the associated StabilEyes and front pack monocular system.

Figure 11:
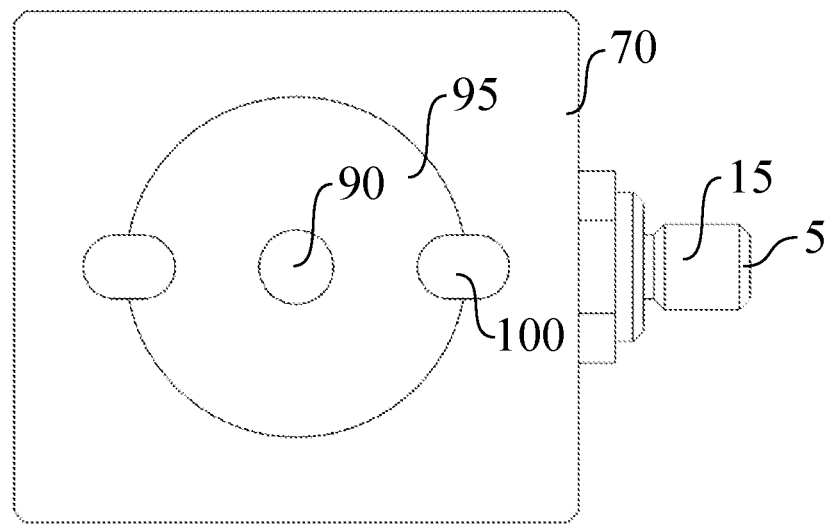
FIG. 11 is a bottom elevational view of the talon and perch system in accordance with an embodiment of the present disclosure.

FIG. 11 is a bottom elevational view of the talon and perch system in accordance with an embodiment of the present disclosure. The view includes limitations similar to the other views herein with the addition of the circular cavities 90 and 95 and the locking pin cavities 100 for engagement with the StabilEyes system also disclosed herein and other mounting shoes.

Figure 12:
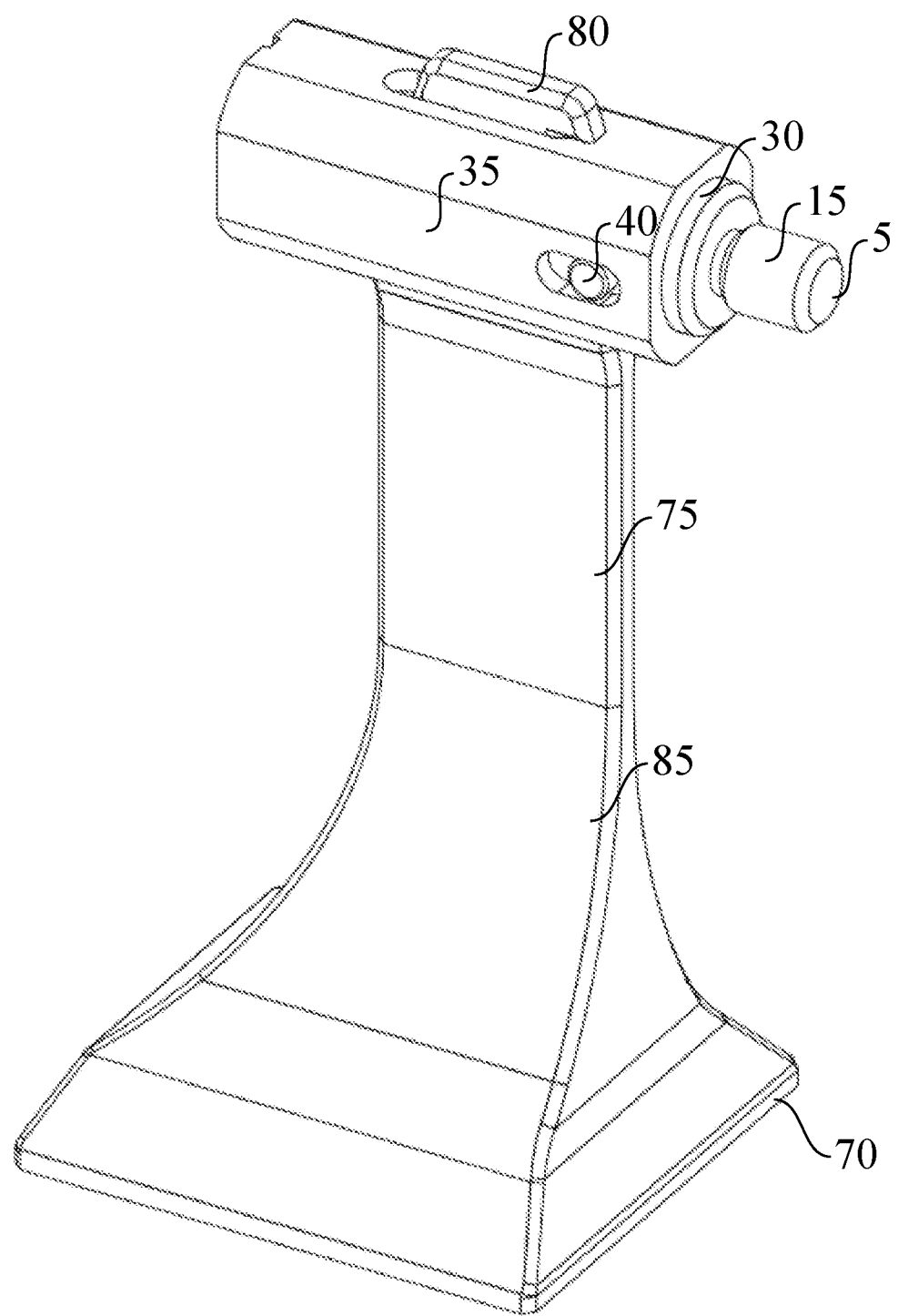
FIG. 12 is a front side perspective view of the talon and perch system in accordance with an embodiment of the present disclosure.

FIG. 12 is a front side perspective view of the talon and perch system in accordance with an embodiment of the present disclosure. The view includes the side pin 40 in the side of the inner bolt which limits a travel of the inner bolt to the slot or opening for the side pin 40. The front end 5 therefore travels the same distance which is enough to disengage the tabular perch top 80 from the elongate talon therefrom against the spring force holding it therein.

Figure 13:
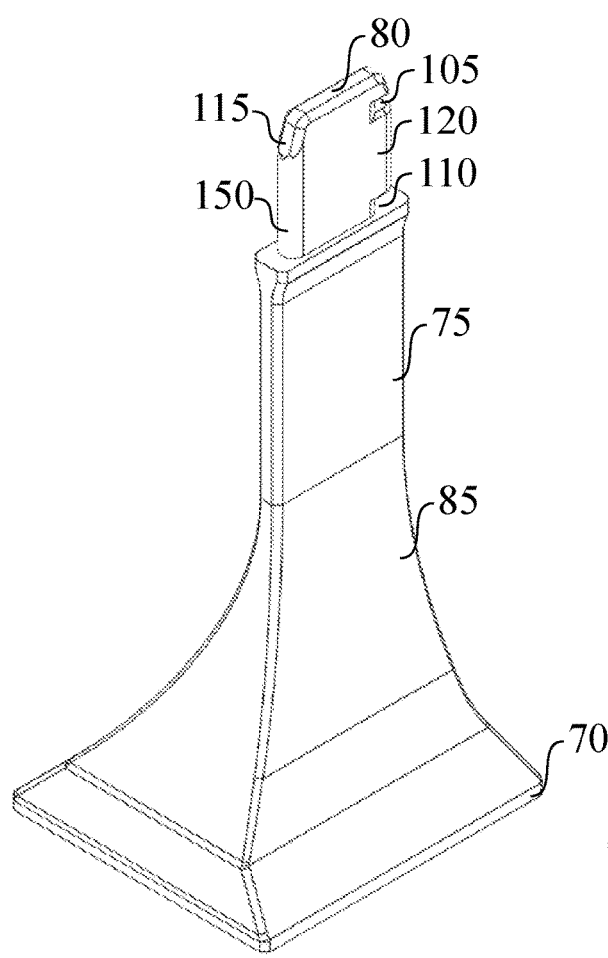
FIG. 13 is a back side perspective view of the tabular perch of the talon and perch system in accordance with an embodiment of the present disclosure.

FIG. 13 is a back side perspective view of the tabular perch of the talon and perch system in accordance with an embodiment of the present disclosure. The present view also depicts the top notch 105, the bottom notch 110, the top rear or back chamfer 115, the tabular perch side 120, and the back edge 150. Other limitations not called out are implicitly included.

Figure 14:
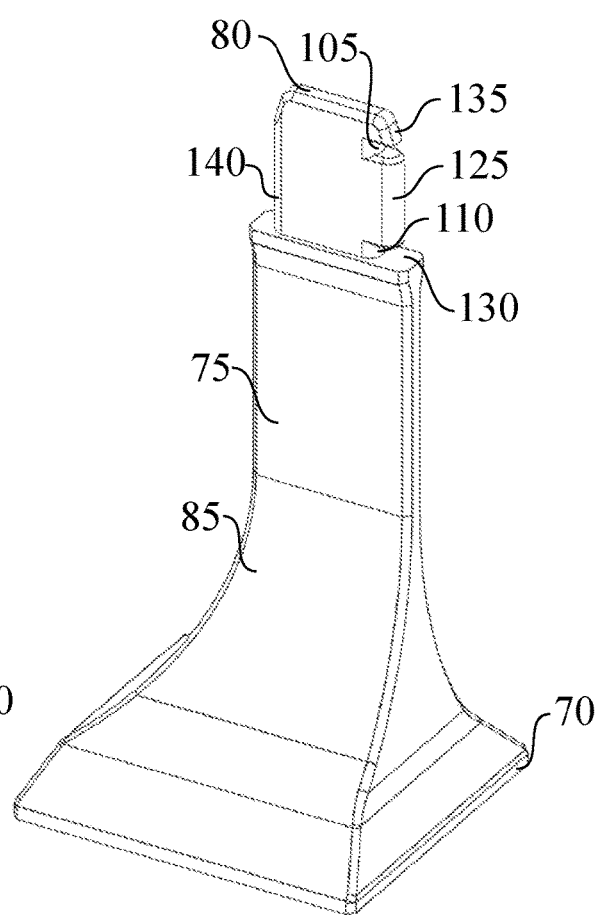
FIG. 14 is a side perspective view of the tabular perch of the talon and perch system in accordance with an embodiment of the present disclosure.

FIG. 14 is a side perspective view of the tabular perch of the talon and perch system in accordance with an embodiment of the present disclosure. The pedestal ledge 130 limits a travel of the tabular perch into the elongate talon and adds structural stability to the combination when locked forward in place by the spring force. A rearward spring force and notches on the back edge 150 are also included in embodiments of the present disclosure according to design needs and constraints.

Figure 15:
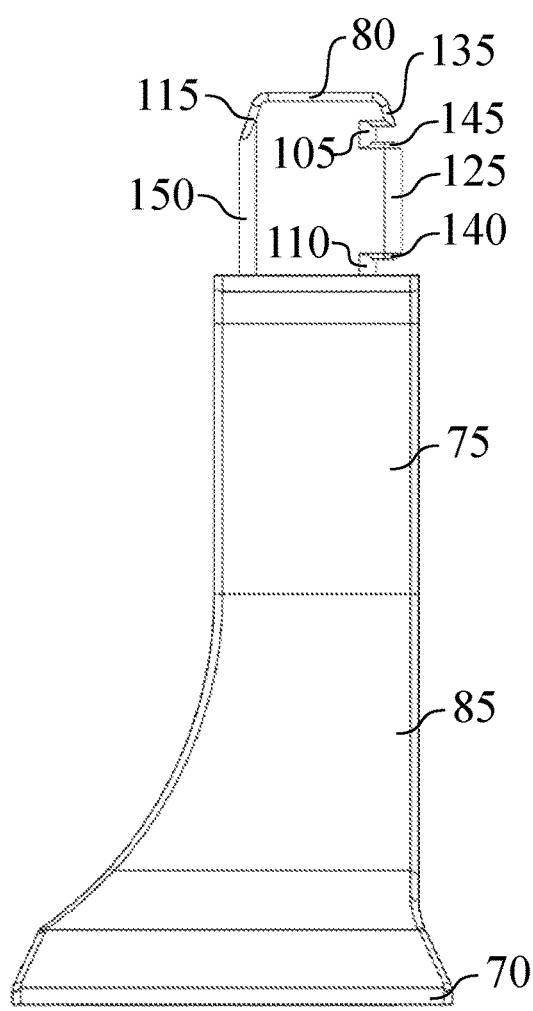
FIG. 15 is a side elevational view of the tabular perch of the talon and perch system in accordance with an embodiment of the present disclosure.

FIG. 15 is a side elevational view of the tabular perch of the talon and perch system in accordance with an embodiment of the present disclosure. In addition to the limitations of the drawings herein, this view includes a bottom boss 140 and a top boss 145 configured to further lock into place the walls of the elongate talon in the respective notches by a mechanical force wherein a resting friction is greater than a moving friction there across and therefore resists movement out of the locking or overlap position.

Figure 16:
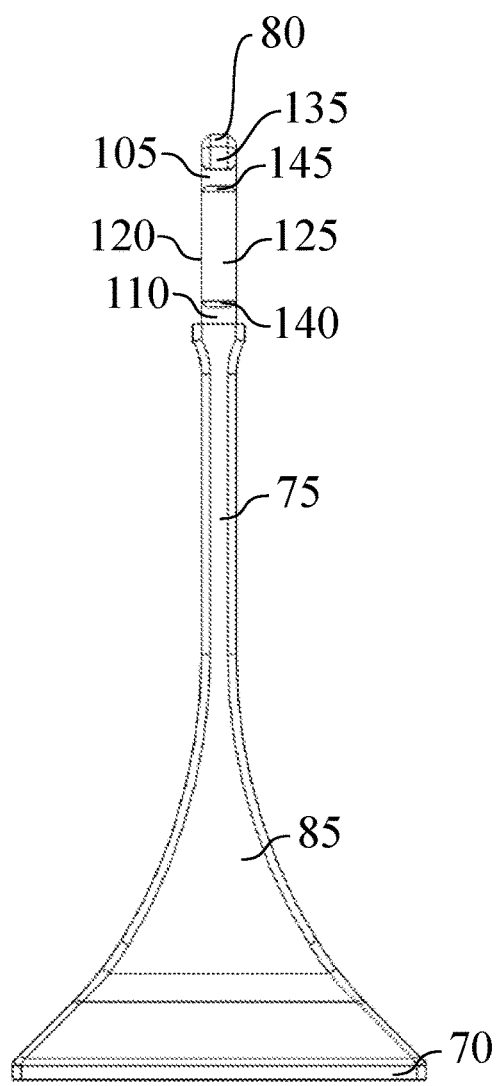
FIG. 16 is a front elevational view of the tabular perch of the talon and perch system in accordance with an embodiment of the present disclosure.

FIG. 16 is a front elevational view of the tabular perch of the talon and perch system in accordance with an embodiment of the present disclosure. The respective view shows the bosses 140 and 145 from a front elevational view.

As stated above, hunters, birders and other binocular users often find they cannot hold binoculars still for extended periods of time. Mounting binoculars on tripods requires special adapters which are difficult and time consuming to use. The invention claimed here solves this problem.

The invention holds binoculars securely on the top of a tripod adapter, similar to those used by binocular, camera and spotting scope users now, except for the mechanism at the top of the adapter, which facilitates binoculars in particular. Once the slotted mounting cylinder is screwed into the binoculars' mounting receptacle, simply depressing the spring loaded cylinder allows the mounting shaft to slide into the slot. Releasing the cylinder locks the binoculars in place and the user is ready for viewing.

The claimed invention differs from what currently exists in its simplicity of operation and reliability of function. This invention is an improvement on what currently exists. This is the only solution to incorporate the simplicity of a stationery slotted mounting cylinder and push-button locking and unlocking.

The combination of complex mechanisms with awkward mounting and dismounting procedures that must be undertaken if the user is to employ the binoculars OFF of the tripod, render virtually all other devices largely impractical. People using binoculars in the field have a need to deploy the binoculars quickly and to store them quickly. If transport, set-up and take-down, is likely to take extra space and time, users will opt not to use their tripod. Hence, current solutions are not providing a practical, viable alternative.

The present disclosed Binocular Mounting System, also known as "Talon Quick Connect Binocular Mounting System", utilizes a simple mechanism which is lightweight, self-contained and easy to set-up and take down. The user never has to disassemble the mount to store binoculars or use them without the tripod.

The Talon Quick Connect Binocular Mounting System and its relationship with the Stabil-Eyes Device is as follows: The Stabil-Eyes Device arrives in the package, already inserted into the Stabil-Eyes Device Insertion pocket, with the pocket secured by hook-and-loop closure. The Stabil-Eyes pack attaches to either an included harness or the user's backpack, using the Binocular Pack Top Harness Buckles and the Binocular Pack Rotational Harness/Belt Buckles, if attaching to a harness. If attaching to a backpack, the Binocular Pack attaches to the Sternum Strap of the backpack using the Binocular Pack-to-Backpack Sternum Strap Attachment, and the Binocular Pack Rotational Harness/Belt Buckles and the Binocular Pack-to-Belt Stabilizing Straps. Either way, the Stabil-Eyes Binocular Sighting System rests on the chest of the user, ready to deploy as needed.

Binoculars are mounted to the Binocular Mounting Bracket and the Binocular Mounting Bracket is then slid onto the Slide Mount. When the user is ready to use binoculars, the binocular pack cover is opened and the binoculars are deployed by lifting the Telescoping Binocular Support Arm to the desired level, and then rotating the binoculars up to the desired angle for viewing, using the Slide Mount-to-Support Arm Attachment. The Telescoping Arm Support and the Arm Support Bracket allow the arm and binoculars to move forward and backward to a comfortable viewing position. The Telescoping Binocular Support Arm Anchor Strap prevents the binoculars and Telescoping Arm from being able to "fall" too far from the front of the user's chest.

From this position the user can make adjustments and view through the binoculars for as long as desired, with little or no physical support supplied by the user's arms and hands. When the user is ready to re-stow binoculars the process is reversed, the pack cover is closed, thereby providing protection for the binoculars when not in use.

The functionality of the Talon Quick Connect Binocular Mounting System is as follows: Binocular Pack, with Stabil-Eyes device enclosed in the Insertion Pocket, is anchored to the user's chest either by harness or backpack sternum strap and buckles to the harness and/or the belt or backpack waist belt. When the user is ready to deploy binoculars, the user opens the Binocular Pack cover, releases the clamps on the Telescoping Binocular Arm Support, raises the binoculars to the desired height and locks the clamps on the Telescoping Binocular Arm Support. The user then raises the binoculars to the desired vertical articulation and locks the Slide Mount at the desired level using the tightening knob. The binoculars are then slid back, toward the user's eyes by moving the binoculars and Binocular Mounting Bracket on the Slide Mount until they click into place.

The user is then free to utilize binoculars for virtually indefinite stable viewing, with 1-hand adjustment of focus and with 1-hand support of the binoculars at the lower part of the Telescoping Binocular Support Arm. Hands-free operation may be possible with the limiting movement insured by the Telescoping Binocular Arm Anchor Strap. If the user wishes to share binoculars with a companion, or simply view without use of the device, the Quick Release permits quick removal and replacement of the binoculars atop the device. When viewing is complete and the user wants to stow the device, the process is reversed by sliding the Binocular Mounting Bracket forward on Slide Mount, loosening the knob on the Slide Mount allowing the binoculars to drop down to the vertical position, then releasing the clamps on the Telescoping Binocular Support Arm, collapsing the Arm into the Binocular Pack and replacing the Binocular Cover.

The Talon Quick Connect Binocular Mounting System is made in the following way: All device parts are aluminum and must be fabricated. It may be possible to fabricate some of them using combinations of other materials and molded parts. Parts of the device are assembled in a logical order. Concurrently the pack is fabricated according to pattern. The pack and device are brought together and the device is inserted into the Stabil-Eyes Device Insertion Pocket and the Telescoping Binocular Support Arm Anchor Strap is secured. The harness and Binocular Pack-to-Belt Stabilizing Straps are included with the package for use at the user's discretion.

All elements are necessary. Pack features like pockets for useful items in the field can add functionality and convenience. Other devices utilizing the Quick Connect mechanism for the binoculars would add versatility.

It is possible to provide additional mounting capabilities which would allow the device to be used for cameras, smartphone mounts, etc. This may require minor additional parts or reconfiguration of the Slide Mount in particular. The product may also be sized differently to accommodate larger binoculars or perhaps even a spotting scope. It is possible to eliminate the binocular pack and configure the basic device with a belt receptacle to perform a similar function.

The Talon Quick Connect Binocular Mounting System is used in the following way: To use the invention a binocular user simply slips the Binocular Pack on using the harness or backpack configuration and deploys the binoculars using the process already described. Deployment or stowage is also possible while on the move.

A quick connect and release device comprising an inner bolt 1 comprising a back end and configured to define an elongate channel 50 longitudinally there through from a top to a bottom thereof and to comprise a side pin 40 and another side pin proximal a front threaded end 15. The disclosed device also includes an elongate talon 35 configured to slidably receive the inner bolt 1 and to define a top slot 45 and a bottom slot to match the elongate channel 50 top and bottom, a back end notch 55 and a front end and a side track and another side track to receive the side pins 40. The disclosed device additionally includes a tabular perch comprising a bottom ledge 130, a top edge 80, a back edge 150 and a front edge 125 configured to be received through the elongate channel 50 from the bottom slot to the top slot 45 and comprise a bottom notch 110 and a top notch 105 on the front edge 125 thereof. A wall width 4 of the elongate talon 35 engages with the tabular perch bottom notch 110 and top notch 105 and locks the tabular perch thereto against a spring force between the back ends limited by a travel of the side pins 40 in the respective side tracks thereof The spring force comes from a spring 3 disposed between the back end of the elongate talon 35 and the back end of the inner bolt 1 as opposed to the front threaded end 15. However, the spring force also comes from material with a memory and pneumatic devices in accordance with embodiments of the present disclosure. The back end of the elongate talon 35 comprises a groove 55 configured to receive a torque tool tip such as a slotted screwdriver or even a coin.

The tabular perch comprises a chamfer on a top of the front edge 125 configured to facilitate the tabular perch reception through the elongate channel 50 and the bottom slot and top slot 45. Additionally, there is a chamfer on a top of a back edge 150 of the tabular perch configured to facilitate the tabular perch reception through the elongate channel 50 and the bottom and top slot 45. The tabular perch further comprises a ledge 130 immediately adjacent the bottom notch 110 configured to limit a travel of the tabular perch through the elongate talon 35.

In an embodiment of the present disclosure, an annular boss 20 adjacent the front threaded end 15 limits a travel of a female thread onto binocular and monocular mounts. An 'o' ring 30 is disposed proximal the front threaded end 15 and an annular boss 20 distal thereto. An outer surface of the elongate talon 35 comprises a plurality of flat sides 6 configured to engage with a wrench or other torque tool.

Embodiments of the disclosure include a pedestal which extends from the bottom of the tabular perch near the bottom notch 110 and the ledge 130 to form a mounting shoe 70 at another end thereof. The back edge of the tabular perch 150 is chamfered to receive a back inside of the elongate channel 50. The front edge of the tabular perch is chamfered to receive a front inside of the elongate channel.

In further embodiments of the disclosure, a travel of the side pins 40 within a respective track is equal to an overlap 2 of the elongate talon 35 top 45 and bottom slots and the elongate channel 50. A backward travel of the inner bolt 1 into the elongate talon 35 against the spring force releases the walls 4 of the elongate talon 35 from the notches 105 and 110 of the tabular perch. A forward travel of the inner bolt 1 out of the elongate talon 35 parallel to the spring force engages the walls of the elongate talon 35 with the notches 105 110 of the tabular perch.

In additional embodiments, the side pins are depressable into the inner bolt 1 to allow a full removal of the inner bolt 1 from the elongate talon 35. The side pins 40 are button shaped bosses extending laterally from the inner bolt 1. A pedestal shoe 70 extends from the bottom of the tabular perch to include circular cavities 90 and 95 and oblong shoe locking pins 100. A pedestal webbing 75 is configured to extend between binocular barrel chambers from a bottom of the tabular perch to the mounting shoe 70.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

What is claimed is:

1. A quick connect and release comprising:
   an inner bolt comprising a back end and configured to define an elongate channel longitudinally there through from a top to a bottom thereof and to comprise a side pin and another side pin proximal a front threaded end;
   an elongate talon configured to slidably receive the inner bolt and to define a top slot and a bottom slot to match the elongate channel top and bottom, a back end and a front end and a side track and another side track to receive the side pins; and
   a tabular perch comprising a bottom, a top edge, a back edge and a front edge configured to be received through the elongate channel from the bottom slot to the top slot and comprise a bottom notch and a top notch on the front edge thereof,
   wherein a wall width of the elongate talon engages with the tabular perch bottom notch and top notch and locks the tabular perch thereto against a spring force between the back ends limited by a travel of the side pins in the side tracks.

2. The quick connect and release connector of claim 1, wherein the spring force comes from a spring disposed between the back end of the elongate talon and the back end of the inner bolt.

3. The quick connect and release connector of claim 1, wherein the back end comprises a groove configured to receive a torque tool tip.

4. The quick connect and release connector of claim 1, further comprising a chamfer on a top of the front edge configured to facilitate the tabular perch reception through the elongate channel and the bottom slot and top slot.

5. The quick connect and release connector of claim 1, further comprising a chamfer on a top of a back edge of the tabular perch configured to facilitate the tabular perch reception through the elongate channel and the bottom and top slots.

6. The quick connect and release connector of claim 1, wherein the tabular perch further comprises a ledge immediately adjacent the bottom notch and configured to limit a travel of the tabular perch through the elongate talon.

7. The quick connect and release connector of claim 1, further comprising an annular boss adjacent the front threaded end and configured to limit a travel of a female thread thereon.

8. The quick connect and release connector of claim 1, further comprising an 'o' ring disposed between the front threaded end and an annular boss distal thereto.

9. The quick connect and release connector of claim 1, wherein an outer surface of the elongate talon comprises a plurality of flat sides configured to engage with a wrench.

10. The quick connect and release connector of claim 1, wherein the front threaded end is configured to be received into a female device including binoculars and monoculars.

11. The quick connect and release connector of claim 1, further comprising a pedestal configured to extend from the bottom of the tabular perch and form a mounting shoe at another end thereof.

12. The quick connect and release connector of claim 1, wherein the back edge of the tabular perch is chamfered to receive a back inside of the elongate channel.

13. The quick connect and release connector of claim 1, wherein the front edge of the tabular perch is chamfered to receive a front inside of the elongate channel.

14. The quick connect and release connector of claim 1, wherein a travel of the side pins within a respective track is equal to an overlap of the elongate talon top and bottom slots and the elongate channel.

15. The quick connect and release connector of claim 1, wherein a backward travel of the inner bolt into the elongate talon against the spring force releases the walls of the elongate talon from the notches of the tabular perch.

16. The quick connect and release connector of claim 1, wherein a forward travel of the inner bolt out of the elongate talon parallel to the spring force engages the walls of the elongate talon with the notches of the tabular perch.

17. The quick connect and release connector of claim 1, wherein the side pins are depressable into the inner bolt to allow a full removal of the inner bolt from the elongate talon.

18. The quick connect and release connector of claim 1, wherein the side pins are button shaped bosses extending laterally from the inner bolt.

19. The quick connect and release connector of claim 1, wherein a pedestal shoe configured to extend from the bottom of the tabular perch comprises circular cavities to receive shoe locking pins.

20. The quick connect and release connector of claim 1, wherein a webbing is configured to extend between binocular barrel chambers from a bottom of the tabular perch to a mounting shoe.

* * * * *